United States Patent [19]
Nishizawa et al.

[11] Patent Number: 5,887,209
[45] Date of Patent: *Mar. 23, 1999

[54] CAMERA CONTAINING A FRAME SHIFT PREVENTION MEMBER AND METHOD

[75] Inventors: Akio Nishizawa; Junichi Omi, both of Kanagawa, Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 597,204

[22] Filed: Feb. 6, 1996

[30] Foreign Application Priority Data

Jun. 28, 1995 [JP] Japan ..................................... 7-162024

[51] Int. Cl.$^6$ ....................................................... G03B 1/00
[52] U.S. Cl. ........................................... 396/399; 396/400
[58] Field of Search ..................................... 354/203, 206, 354/212, 213, 288; 396/387, 392, 395, 398, 400, 399

[56] References Cited

U.S. PATENT DOCUMENTS

| | | | |
|---|---|---|---|
| 3,709,128 | 1/1973 | Beach | 354/217 |
| 4,914,462 | 4/1990 | Pagano | 354/213 |
| 5,459,543 | 10/1995 | Suzuki et al. | 354/203 |
| 5,521,668 | 5/1996 | Ezawa | 354/203 |
| 5,555,053 | 9/1996 | Stephenson, III | 396/399 |

FOREIGN PATENT DOCUMENTS 63-180839  11/1988  Japan .

*Primary Examiner*—Safet Metjahic
*Assistant Examiner*—Michael Dalakis
*Attorney, Agent, or Firm*—Oliff & Berridge, PLC

[57] ABSTRACT

A camera that prevents frame shifting without hindering a film feeding. The camera includes a cartridge chamber housing a film cartridge, a film passage forming member, a film passage restricting the film in accordance with the film passage forming member, a film introduction route from the cartridge chamber to the film passage. The camera further includes a frame shift prevention member with an insertion unit engaging with the film perforations and controlling the film movement. An angle of inclination of an opposing face on the insertion unit is provided so that a surface of the opposing face on the cartridge chamber side is coplanar to smoothly connect with a wall in the film introduction route.

21 Claims, 7 Drawing Sheets

CAMERA CONTAINING A FRAME SHIFT PREVENTION MEMBER AND METHOD

BACKGROUND OF THE INVENTION

1. Field the Invention

The present invention relates to a camera that prevents shifting of the frames of the film.

2. Background of Related Art

A first type of conventional camera has a sprocket between the cartridge chamber and the spool chamber. The sprocket engages the film perforations to feed the film. In other words, a film feeding force is transferred to the film from the sprocket. Because the sprocket is enmeshed with the film perforations in the conventional camera, there is little danger of the film suffering a frame shift even when the camera is shaken or when the camera sustains an outside impact. Frame shift occurs when the film moves from a preset halted position toward the direction of film feeding. However, a second type of conventional camera does not include a sprocket because the film is fed by rotating a spool or a cartridge shaft. In the second type of conventional camera, there is a danger that a frame shift could occur when the camera is shaken or sustains an impact.

A camera equipped with a function to prevent frame shifting is disclosed in Japanese Laid-Open Patent Publication Sho 63-180839, the subject matter of which is incorporated herein by reference. This camera includes: a film passage forming member that maintains the film flatness by pressing on the film from the back of the camera, a film passage forming member spring forcing the film passage forming member against a film-receiving plane, a film pressing spring integrally formed with the film passage forming member spring and film pressing unit on the front end of the film pressing spring, which presses the outside of an effective surface of the film toward the film-receiving plane.

Compared to cameras that do not have a film pressing unit, it is more difficult for film frame shift to occur when the camera is shaken or sustains an outside impact in a camera equipped with the film pressing unit. However, the outside of the effective surface of the film is merely pressed by the pressing unit. Therefore, compared to the conventional camera where the film is fed by a sprocket enmeshing with the film perforations, there are cases where a frame shift cannot absolutely be prevented.

SUMMARY OF THE INVENTION

It is an object of the present invention to provide a camera that prevents frame shifting, while allowing smooth feeding of the film.

The camera according to the present invention includes: a cartridge chamber housing a film cartridge, a film passage forming member, a film passage that tapers off along the film passage to restrict the film to a form corresponding to the film passage forming member, a film introduction route between the cartridge chamber and the film passage, and a frame shift prevention member that includes an insertion unit engaging the film perforations to control film movement. Two opposing faces formed on the insertion unit are each inclined with respect to the direction of film feeding. The insertion unit perpendicularly intersects the walls forming the film introduction route. Through the force of film feeding, the insertion unit is protruded into the film passage and withdrawn from the film passage.

The angles of inclination of the opposing faces of the insertion unit of the frame shift prevention member are determined so that a first inclined surface (opposing face) on the cartridge chamber side connects smoothly with a wall forming the film introduction route. Therefore, a tip of the film being fed from the film cartridge does not catch on the film shift prevention member. Thus, frame shifting is prevented through determining the angle of inclination of the opposing first inclined surface.

The camera can further include an arm unit elastically supporting the insertion member, which includes the first inclined surface and a second inclined surface. The first inclined surface opposes the second inclined surface and each are inclined with respect to the direction of film feeding to perpendicularly protrude the insertion unit into and withdraw the insertion unit from the film passage through the force of film feeding.

In addition, a portion of the wall surface can be composed of the film passage forming member. Further, the frame shift prevention member can be attached to the film pressure forming member. Thus, the frame shift prevention member can be easily and precisely positioned and secured with respect to the wall surface. Alternatively, the frame shift prevention member can be formed as a single piece (integrally) with the film passage forming member. Further, the camera can include an introduction surface in the arm unit of the frame shift prevention member to smoothly transition to a wall surface in the camera body that forms a film introduction route. Therefore, a tip of the film being fed from the film cartridge does not catch on the film shift prevention member.

The camera can also have a portion of the wall surface composed of the camera body. In this case, the frame shift prevention member can be attached to the camera body. Thus, the frame shift prevention member can be easily and precisely secured with respect to the wall surface. In this case also, the frame shift prevention member can alternatively be formed as a single piece with the camera body.

With the camera according to the present invention, the opposing first inclined surface smoothly connects with the wall surface. The introduction surface in the arm unit can also smoothly connect with the wall surface in the camera body. Thus, the film does not get caught on the frame shift prevention member during feeding of the film.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
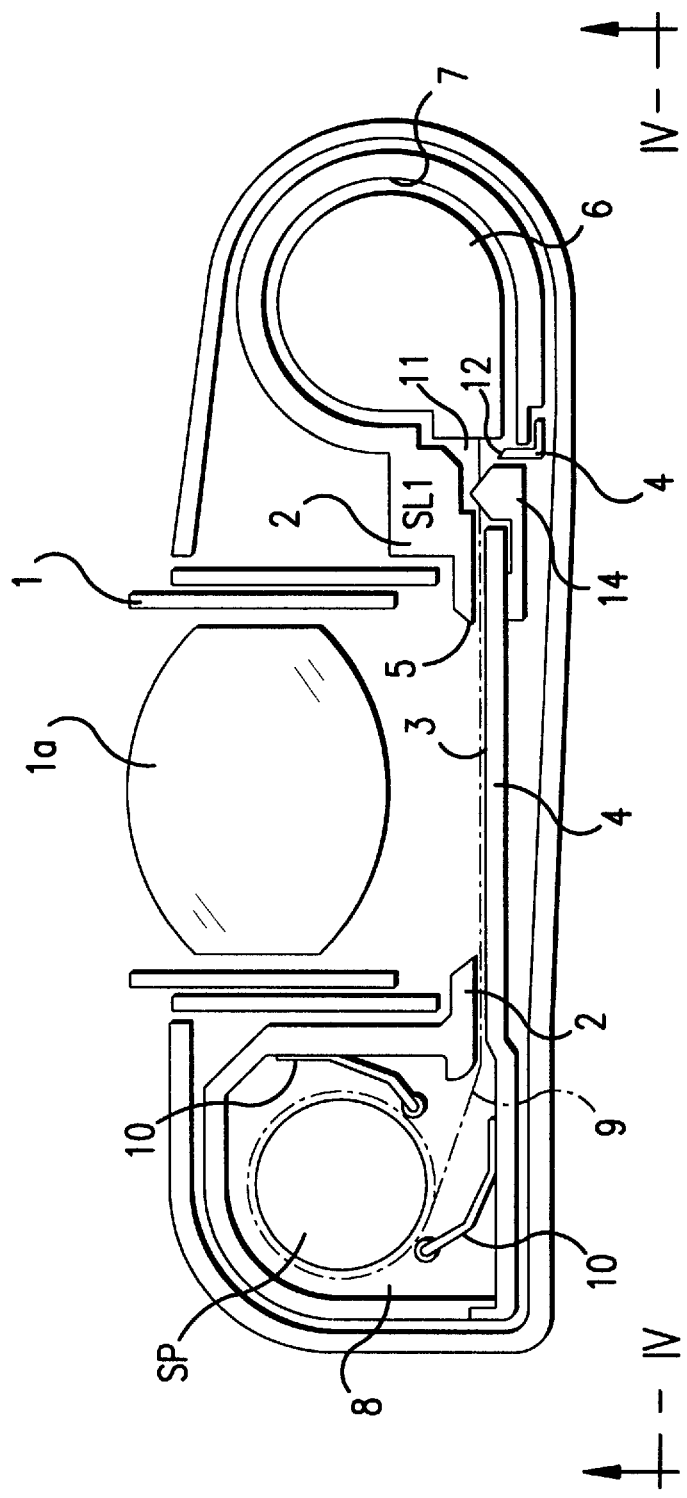
FIG. 1 is a cross-sectional diagram showing an embodiment of the camera having a frame shift prevention member according to the present invention.

FIGS. 1–4 show a first preferred embodiment of a camera according to the present invention. As shown in FIG. 1, a lens barrel 1 equipped with a lens 1a attaches in the center of the camera to slide in the direction of the optical axis. Behind the lens barrel 1, an aperture 3 in the camera body 2 restricts the exposure region. Behind the aperture 3 is a film passage forming member 4. A film passage 5 is between the film passage forming member 4 and the camera body 2 having the aperture 3. As shown in FIG. 1, the film passage 5 is in the right side of the inside of the camera. A cartridge chamber 7 housing a film cartridge 6 is also on the right side of the inside of the camera. A spool chamber 8 is on the left side so that a film 9, which is fed out from the film cartridge 6, reaches the spool chamber 8 by passing through the film passage 5. The film 9 from the cartridge 6 winds around a spool shaft SP in the spool chamber 8. A film pressing unit 10 in the spool chamber 8 presses the wound film 9 from the outside.

A film introduction route 11 is between the cartridge chamber 7 and the film passage 5. The film 9 from the film cartridge 6 in the cartridge chamber 7 feeds to the film introduction route 11. The film 9 is then guided to the film passage 5. A wall surface 12 of the film passage forming member 4 restricts the film introduction route 11. A wall surface 13 of the camera body 2 and the film introduction route 11 slant with respect to the feed direction of the film 9. Further, the film introduction route 11 has a tapered shaped moving from the cartridge chamber 7 toward the film passage 5. The film introduction route 11 guides the film 9 from the film cartridge 6 smoothly to the film passage 5.

Figure 2:
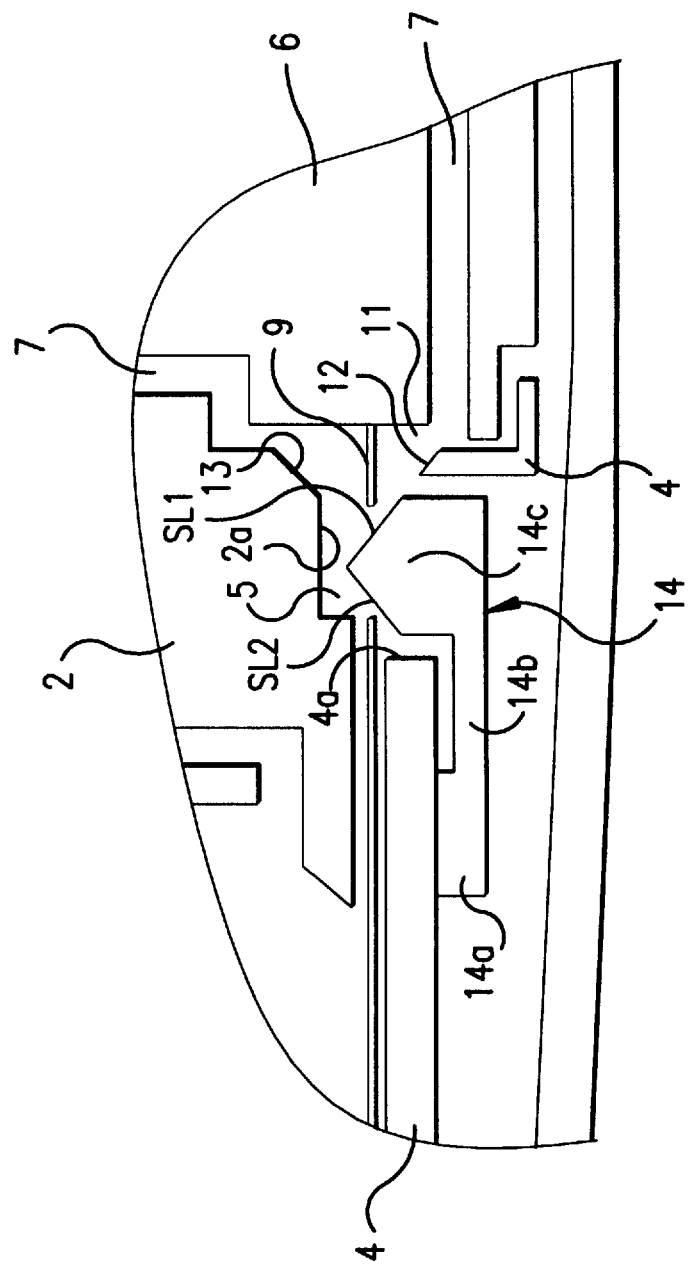
FIG. 2 is a partial enlarged diagram showing the frame shift prevention member of FIG. 1.
Figure 3:
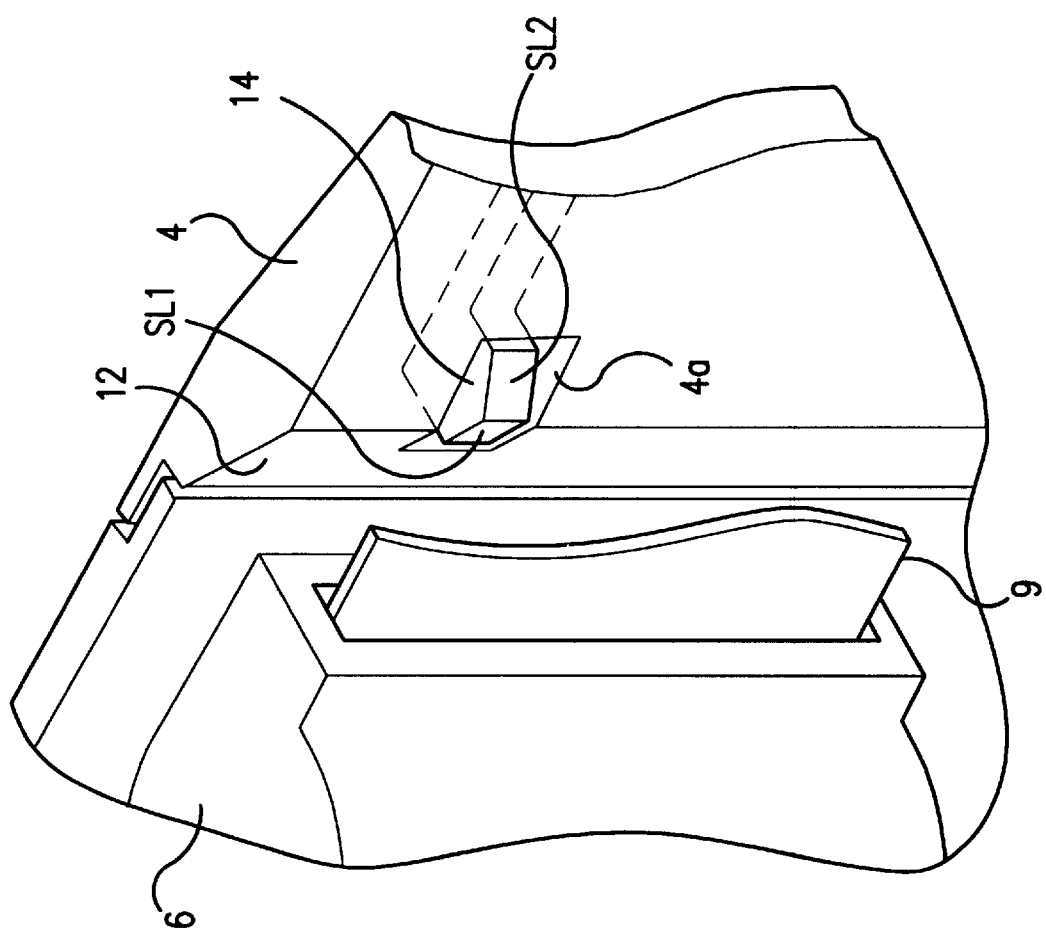
FIG. 3 is an enlarged oblique diagram showing the frame shift prevention member of FIG. 1.
Figure 4:
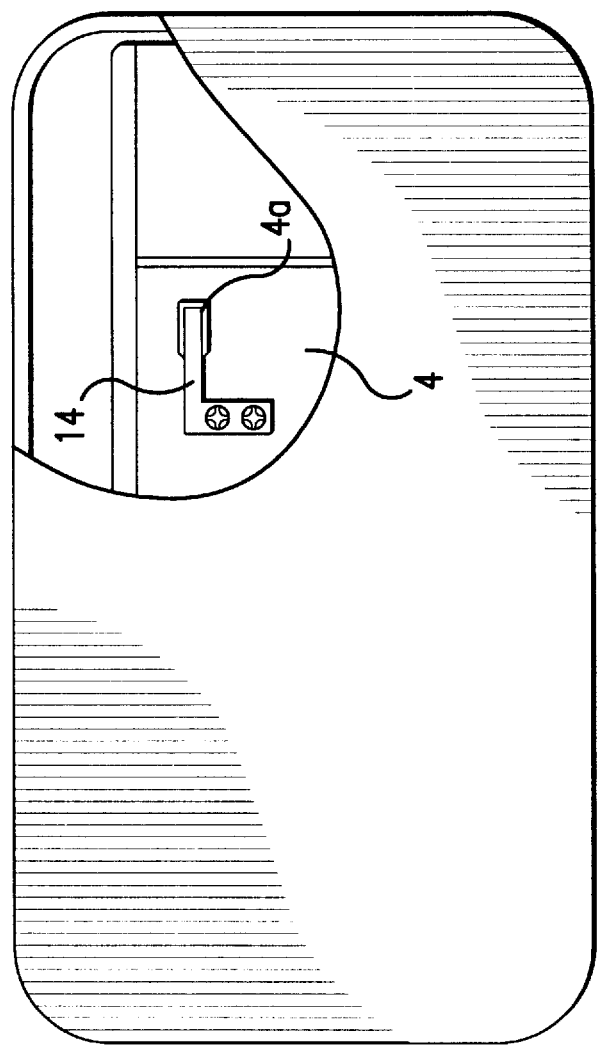
FIG. 4 is a rear surface diagram of the camera from the direction of line IV—IV in FIG. 1 showing one method of attaching the frame shift prevention member.

As shown in FIGS. 3 and 4, a rectangular aperture 4a in the film passage forming member 4 opens at a position opposite film perforations in the film 9. A frame shift prevention member 14 is fixed to the film passage forming member 4 as shown in FIG. 2. The frame shift prevention member 14 includes an attachment base 14a, an arm 14b that extends from the attachment base 14a and an insertion unit 14c at the tip of the arm 14b. For example, the attachment unit 14a can be fixed to the back surface of the film passage forming member 4 by a screw. Alternatively, the frame shift prevention member 14 can be integrally formed as a single piece with the film passage forming member 4. The film passage forming member 4 can be formed using resin injection molding or the like.

The insertion unit 14c inserts into the aperture 4a and the tip of the insertion unit 14c crosses the film passage 5. The insertion unit 14c protrudes toward a notch 2a in the camera body 2 opposite the aperture 4a. When the film 9 moves, the insertion unit 14c is pressed by the film surface to deform the arm 14b, which is made of an elastic material. Thus, the insertion unit 14c withdraws from the notch 2a toward the back of the camera. Therefore, the motion of the film 9 is not hindered. When a film perforation in the film 9 faces the insertion unit 14c through film 9 feeding, the arm 14b is restored to insertion of the insertion unit 14c into the film perforation by the elastic restoring force of the arm 14b, as shown in FIG. 2.

The horizontal cross-sectional shape of the insertion unit 14c is an inverted "V". As shown in FIG. 2, a first inclined surface SL1 is on the cartridge chamber 7 side and a second inclined surface SL2 is on the spool chamber 8 side. However, even if the insertion unit 14c cross-sectional shape is not the inverted "V", frame shifting in the direction of film feeding can be prevented when the insertion unit 14c protrudes into the film perforations. For example, the cross-sectional shape of an insertion unit (not shown) could be rectangular (i.e., the shape of the film perforations and smaller in size). However, the rectangular shape prevents the insertion unit from withdrawing because of the film 9 feeding force. Therefore, the rectangular shaped insertion unit requires a mechanism to synchronously withdraw the insertion unit from the film passage 5 when the film 9 is fed from the cartridge 6. To omit the withdrawal mechanism from the camera, the insertion unit 14c preferably withdraws under the film feeding force. Consequently, the first and second inclined surfaces SL1, SL2 facing the cartridge chamber 7 and the spool chamber 8, respectively, are inclined.

Inclined surfaces on the insertion unit 14c cause the insertion unit to withdraw from the film passage 5 under the film 9 feeding force. However, the insertion unit 14c does add resistance from the insertion unit 14c to the film 9 feeding. Reducing the resistance to the film 9 feeding decreases the consumption of battery power and shortens the film 9 feeding time. The resistance to film feeding varies with the angle of inclination of the inclined surfaces, SL1 and SL2, respectively. The smaller the angle of inclination that the inclined surface makes with respect to the film feed direction, the smaller the film feeding resistance. However, reducing the resistance to film feeding also reduces the ability to control frame shift. Thus, the inclined surfaces, SL1 and SL2, respectively, have an angle of inclination satisfying all the conditions.

A state where the film 9 does not press on the frame shift prevention member 14 is shown in FIGS. 2 and 3. The film 9 does not press the frame shift prevention member 14 because the inclined surface SL1 on the cartridge chamber 7 side is positioned coplanar with the wall surface 12 in the film passage forming member 4. When the inclined surface SL1 and the wall surface 12 are not coplanar, for example when the frame shift prevention member 14 protrudes further than the wall surface 12, a step is created that can possibly catch the film 9. In particular, when a film feeding out cartridge is used, a tip of the film 9 easily can get caught on such a step to cause a problem when guiding the film 9 to the film passage 5. Accordingly, the frame shift prevention member 14 preferably does not protrude farther than the wall surface 12. Therefore, the film 9 feeding is problem free. Further, the frame shift prevention member 14 can be affixed to the film passage forming member 4 for a smooth connection with the wall surface 12. Therefore, the film 9 feeding can be made smooth.

In the first preferred embodiment, the frame shift prevention member 14 is positioned to block a portion of the film introduction route 11. Thus, with the frame shift prevention member 14, the camera width is not necessarily increased.

When a frame shift prevention member 14 is Positioned in the film passage 5, the frame shift prevention member 14 is housed by elongating the film passage 5 between the film cartridge chamber 7 and the aperture 3. In this case the camera width increases.

When the film 9 feeds out from the film cartridge 7, loads, winds and rewinds, then the film 9 presses in the front-to-back direction of the camera through the insertion unit 14c. The amount of force in the film 9 pressing the insertion unit 14c determines the arm 14b shape. The arm 14b must deform under the force of the film 9 during camera operations, i.e., film feeding. However, the arm 14b can be pressed toward the rear of the camera because of the camera shaking or an impact from an external action to the camera. The pressing force to the rear of the camera impacts the inclined surface 14c of the insertion unit through the film perforation. That is to say even when a frame shift is prevented by the frame shift prevention member 14.

Therefore, the shape of the arm 14b is determined so that the insertion unit 14c does not separate from the film perforation when a force in the front-to-back direction of the camera acts on the insertion unit 14c under the film moving force caused by the camera shaking or the external impact.

When shaking or an external impact acts on the camera according to the first preferred embodiment and the film 9 moves in the winding or the rewinding direction, the film perforation edge impacts the inclined surface SL1 or SL2, respectively, of the insertion unit 14c. As described above, the frame shift prevention member 14 does not withdraw under shaking or impact on the camera. The insertion unit 14c remains in the film perforation to prevent the film 9 from shifting position by more than the permissible value.

In the first preferred embodiment, the inclined surface SL1 and the wall surface 12 are both flat surfaces that are coplanar with each other. However, the flat surface is intended to be illustrative and not limiting. For example, curved surfaces for the wall surface 12 and the inclined surface SL1 would also be acceptable. Further, the frame shift prevention member 14 preferably does not protrude by itself, but connects smoothly with the inclined surface 12. However, similar results can be obtained. For example, the inclined surface SL1 and the wall surface. 12 can also be positioned in a coplanar state. In a coplanar state, along a line of the plane the frame shift prevention member 14 protrudes slightly more than the wall surface 12. In addition, the inclined surface SL2 can also be a curved surface.

Figure 5:
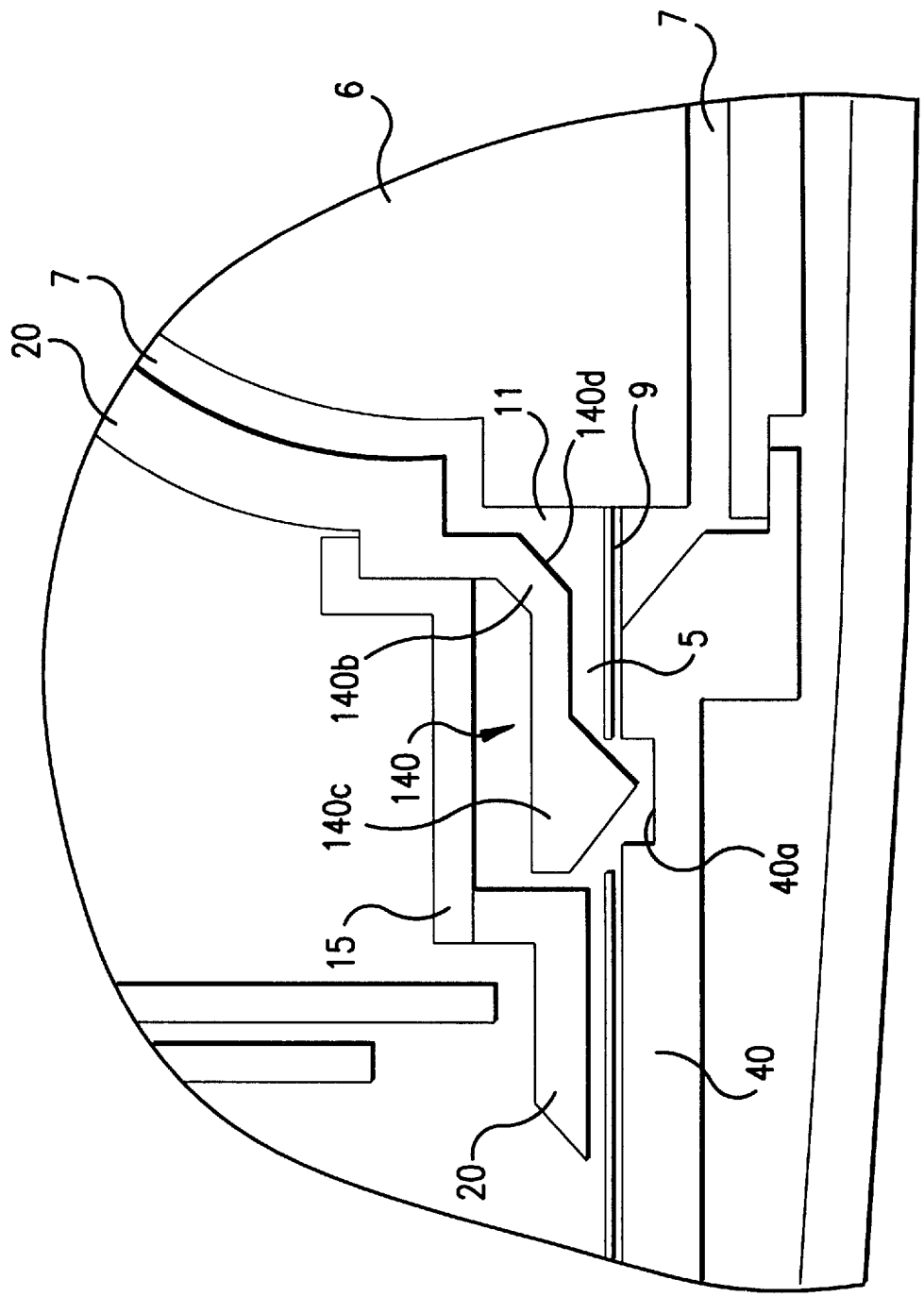
FIG. 5 is an enlarged cross-sectional diagram showing another embodiment of a camera having a frame shift prevention member according to the present invention.
Figure 6:
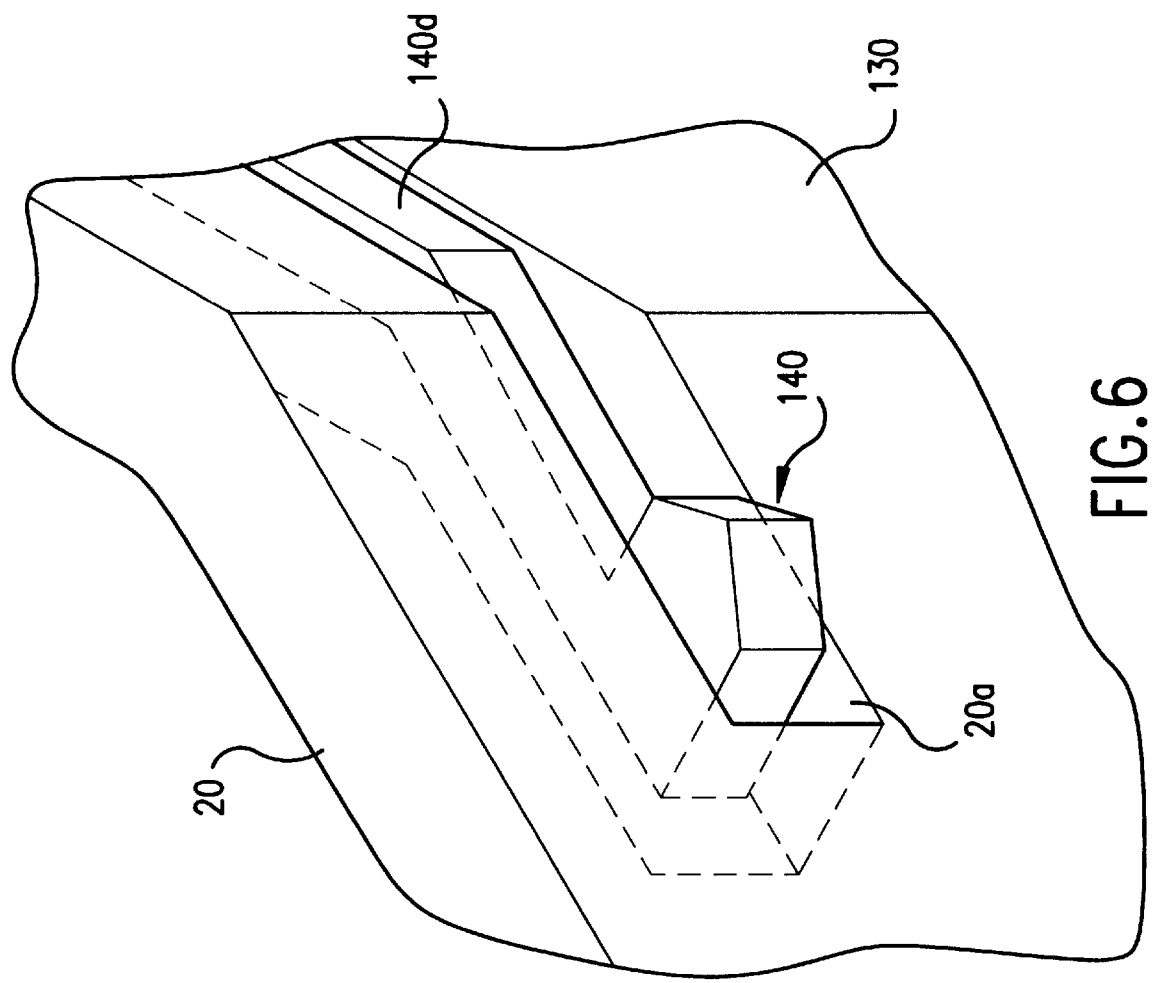
FIG. 6 is an enlarged oblique diagram showing the frame shift prevention member of FIG. 5.
Figure 7:
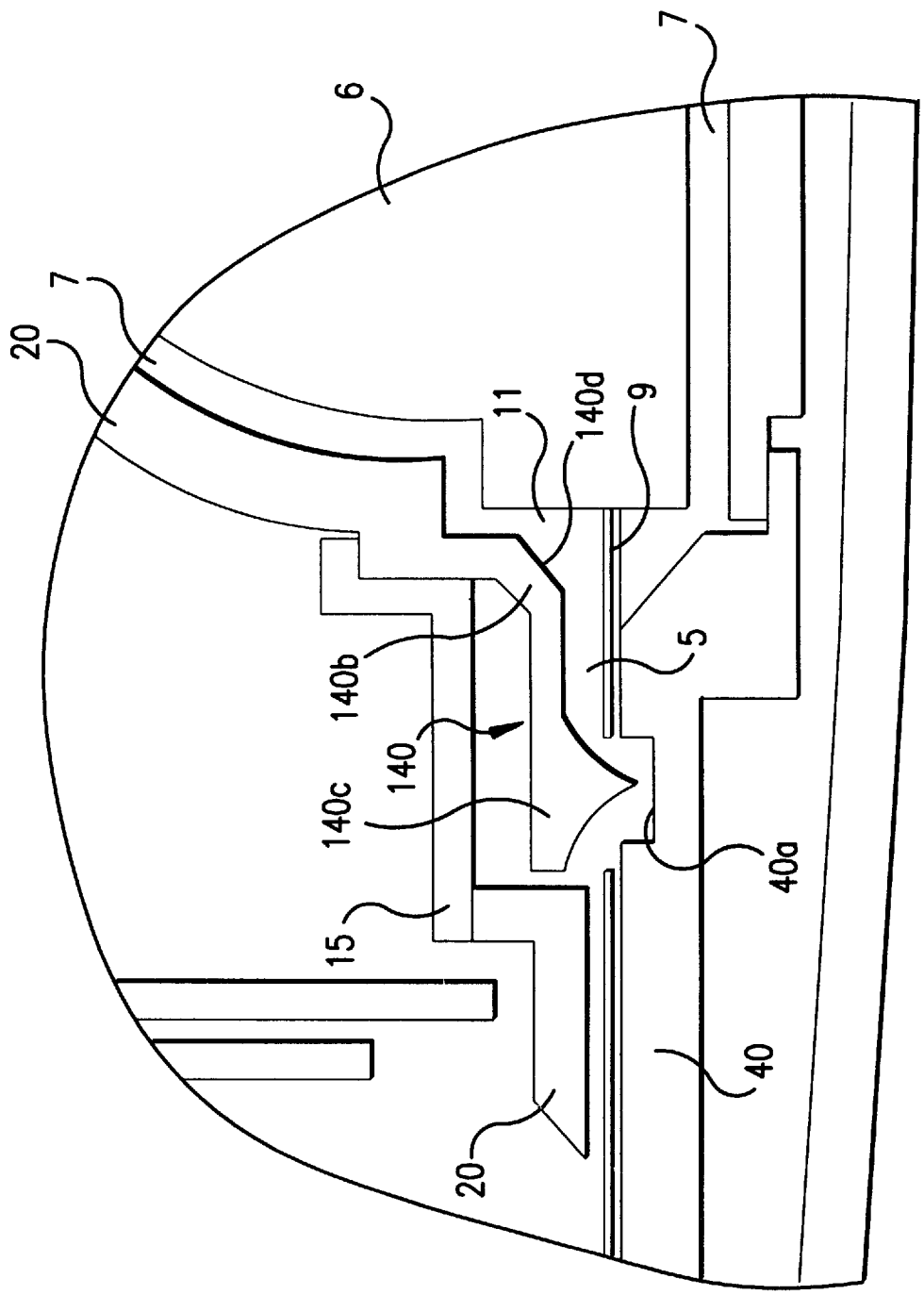
FIG. 7 is m enlarged cross-sectional diagram showing another embodiment of a camera having a frame shift prevention member according to the present invention.

A second preferred embodiment of a camera according to the present invention is shown in FIGS. 5–6. In the second embodiment, the camera body 20 includes a cartridge chamber 7 bent to fit the external shape of a film cartridge. A portion of the wall of the film passage 5 and the film introduction route 11 extend to the left as shown in FIG. 5. A frame shift prevention member 140 is integrally formed with a camera body 20. The frame shift prevention member 140 includes an arm 140b and an insertion unit 140c formed on the tip of the arm 140b. A light-shielding member 15 toward the front of the camera from the frame shift prevention member 140 blocks stray light.

As shown in FIG. 5, the tip of the insertion unit 140c passes through the perforations in the film 9, and protrudes toward a film passage forming member notch 40a in the film passage forming member 40 opposite the insertion unit 140c. When the film 9 moves, the arm 140b deforms and the insertion unit 140c withdraws toward the front of the camera. Thus, the insertion unit 140c is extracted from the film perforation during film 9 feeding. As shown in FIG. 5, when the next film perforation faces the insertion unit 140c, the insertion unit 140c rebounds under the elastic restoring force of the arm 140b and inserts into the film perforations.

As shown in FIGS. 5 and 6, the arm 140b of the frame shift prevention member 140 is housed in an aperture 20a in the camera body 20 wall of the film introduction route 11 and the film passage 5. An introduction surface 140d of the arm 140b is coplanar with a wall surface 130. Thus, the arm 140b minimally protrudes into the film introduction route 11 and the film passage 5. Thus, any obstruction of the film 9 feeding can be avoided. In addition, by housing the arm 140b in the wall 20 of the film introduction route 11, the frame shift prevention member 140 does not necessarily increase the camera size.

In the second preferred embodiment, the wall surface 130 of the introduction route 11 and the introduction surface 140d are both flat surfaces. However, the flat surface is intended to be illustrative and not limiting, because curved surfaces and the like are also acceptable. Preferably the frame shift prevention member 140 does not protrude with respect to the film introduction route 11 and is formed so that the introduction surface 140d connects smoothly with the wall surface 130.

With the camera according to the present invention, shifting of the film position by more than a permissible value does not occur because of camera impact or camera shaking because a frame shift prevention member engages with the film perforations. In addition, a film introduction route between the cartridge chamber and the film passage combined with an inclined surface on the insertion unit or an introduction surface in the arm unit to connect smoothly with the wall surface. The wall surface can be independent, a part of the film passage forming member or the camera body. Consequently, the tip of the film does not catch on the frame shift prevention member when the film feeds from the film cartridge. Therefore, film feeding can proceed smoothly.

Further, the frame shift prevention member is near the film introduction route or in a portion of the film introduction route. Therefore, the film passage is not elongated to secure space for attaching the frame shift prevention member. Thus, the camera width can be reduced.

When the wall surface including the film introduction route is formed on the film passage forming member, the frame shift prevention member can be easily and precisely attached to the wall surface. When the film passage forming member is integrally formed with the film passage forming member, the camera can be produced inexpensively.

When the wall surface including the film introduction route is formed on the camera body, the frame shift prevention member can be easily and precisely attached to the wall surface. When the frame shift prevention member is formed integrally with the camera body, the camera can be produced inexpensively.

While this invention has been described in conjunction with the specific embodiments outlined above, it is evident that many alternatives, modifications and variations will be apparent to those skilled in the art.

Accordingly, the preferred embodiments of the invention as set forth above are intended to be illustrative, not limiting. Various changes may be made without departing from the spirit and scope of the invention as defined in the following claims.

What is claimed is:

1. A film feeding device, comprising:
   a cartridge chamber housing a film cartridge;
   a film passage forming member;
   a film passage formed by the film passage forming member;
   a film introduction route having at least one wall having a surface, the film introduction route connecting the chamber and the film passage, the film introduction route tapering from the cartridge chamber toward the film passage; and
   a frame shift preventing member, wherein the prevention of film shift is provided substantially solely by the frame shift preventing member, the frame shift preventing member comprising:

an insertion unit engaging with film perforations in the film, and a first inclined surface adjacent to a second inclined surface on the insertion unit opposing the film passage, the first inclined surface and the second inclined surface being each inclined with respect to a film feeding direction, the insertion unit intersecting the wall of the film introduction route to protrude into the film passage to engage the film perforations by protruding within the film perforations whereby film frame shift is prevented substantially solely by the frame shift prevention member, the insertion unit withdrawing from the film passage and at least a first perforation of film through a film feeding force against at least one of the first inclined surface and the second inclined surface regardless of the film feeding direction.

2. The film feeding device according to claim 1, wherein the first inclined surface is coplanar with the wall of the film introduction route.

3. The film feeding device according to claim 1, wherein the frame shift prevention member further comprises:

an arm unit elastically supporting the insertion unit along with the first inclined surface and the second inclined surface; and an introduction surface in the arm unit of the frame shift prevention member, the introduction surface being coplanar and adjacent to a wall surface of the film introduction route.

4. The film feeding device according to claim 1, wherein the frame shift prevention member further comprises a withdrawal mechanism to extend the insertion unit into the film perforations between film feedings and to withdraw the insertion unit from the film perforations during the film feeding.

5. The film feeding device according to claim 1, wherein at least a portion of the wall surface of the film introduction route is a film passage forming member, the frame shift prevention member attaching to the film passage forming member.

6. The film feeding device according to claim 1, wherein the wall surface is part of a device body, the frame shift prevention member being attached to the device body.

7. The film feeding device according to claim 1, wherein an angle of inclination of one of the first inclined surface and the second inclined surface is substantially coplanar with the wall of the introduction route.

8. The film feeding device according to claim 1, wherein the angle of inclination of the first inclined surface and the second inclined surface is based on the film feeding force.

9. The film feeding device according to claim 1, further comprising a deformable arm connecting the insertion unit to one of the film passage forming member and a device body wall, wherein an angle of inclination of the first inclined surface and the second inclined surface is determined by a force sufficient to overcome an elasticity of the deformable arm.

10. The film feeding device according to claim 1, wherein the insertion unit perpendicularly intersects the wall of the film introduction route to enter the film perforations.

11. The film feeding device according to claim 1, wherein at least one of the wall of the film introduction route, the first inclined surface and the second inclined surface are curved.

12. A method of feeding film in a camera, the camera having a frame shift prevention member including an insertion unit having a first inclined surface and a second inclined surface, each being inclined with respect to a film feeding direction, the method comprising the steps of:

projecting the insertion unit into a film passage;

feeding the film from a film cartridge to the film passage;

withdrawing the insertion unit from the film passage and at least a first perforation of film using a film feeding force substantially solely from the contact between at least one of the first inclined surface and the second inclined surface and the film regardless of the film feeding direction; and engaging film perforations with the insertion unit to control film movement.

13. The method of claim 12, wherein the withdrawing step comprises the step of deforming an elastically deformable arm supporting the insertion unit.

14. The method of claim 12, further comprising the step of supportively connecting the insertion unit to one of a camera body wall and a film passage forming member.

15. The method of claim 12, further comprising the step of forming the insertion unit as a single unit with one of a camera body wall and a film passage forming member.

16. The method of claim 12, wherein the engaging step comprises the step of protruding the insertion unit in the film perforations in the film path when the film is stopped between frames.

17. The method of claim 16, wherein the protruding step comprises the step of preventing the film frame from shifting between film frames when the camera shakes.

18. A camera comprising:

a cartridge chamber housing a film cartridge;

a film passage;

film passage forming means for forming the film passage;

film introduction means for connecting the cartridge chamber and the film passage; and frame shift prevention means comprising:

insertion means for engaging with film perforations in the film to control film movement, and a first inclined surface adjacent to a second inclined surface on the insertion means facing the film passage for intermittently contacting the film, the first inclined surface and the second inclined surface each being inclined with respect to a film feeding direction, the insertion means intersecting a wall of the film introduction means when engaging with the film perforations wherein the first inclined surface is coplanar with the wall of the film introduction means.

19. The camera according to claim 18, wherein the frame shift prevention means further comprises:

an arm means elastically supporting the insertion means along with the first inclined surface and the second inclined surface; and an introduction surface in the arm means of the frame shift prevention means, the introduction surface being coplanar and adjacent to the wall of the film introduction means.

20. The camera according to claim 18, wherein the frame shift prevention means further comprises a withdrawal means to extend the insertion means into film perforations between film feedings and to withdraw the insertion means from the film perforations during the film feeding.

21. A film feeding device, comprising:
a cartridge chamber housing a film cartridge;
a film passage forming member;
a film passage formed by the film passage forming member;
a film introduction route connecting the chamber and the film passage, the film introduction route tapering from the cartridge chamber toward the film passage; and
a frame shift prevention member comprising:
   an insertion unit engaging with film perforations in the film to control film movement, and
   a first inclined surface adjacent to a second inclined surface on the insertion unit opposing the film passage, the first inclined surface and the second inclined surface being each inclined with respect to a film feeding direction, the insertion unit intersecting a wall of the film introduction route to protrude into the film passage, the insertion unit withdrawing from the film passage through a film feeding force against at least one of the first inclined surface and the second inclined surface, wherein the frame shift prevention member being formed as a single piece with one of the film passage forming member when the wall surface is part of the film passage forming member and a device body when the wall surface is part of the device body.

* * * * *